(12) United States Patent
Bhavsar

(10) Patent No.: US 12,460,361 B1
(45) Date of Patent: Nov. 4, 2025

(54) PORTABLE ICE RINK SPRINKLER

(71) Applicant: Abdhish Bhavsar, Medina, MN (US)

(72) Inventor: Abdhish Bhavsar, Medina, MN (US)

(*) Notice: Subject to any disclaimer, the term of this patent is extended or adjusted under 35 U.S.C. 154(b) by 349 days.

(21) Appl. No.: 18/124,311

(22) Filed: Mar. 21, 2023

Related U.S. Application Data

(63) Continuation-in-part of application No. 15/613,177, filed on Jun. 3, 2017, now abandoned.

(51) Int. Cl.
| | | |
|---|---|---|
| *E01H 4/02* | (2006.01) | |
| *B05B 1/04* | (2006.01) | |
| *B05B 1/34* | (2006.01) | |
| *B05B 15/652* | (2018.01) | |

(52) U.S. Cl.
CPC ............ *E01H 4/023* (2013.01); *B05B 1/04* (2013.01); *B05B 1/34* (2013.01); *B05B 15/652* (2018.02)

(58) Field of Classification Search
CPC ......... B05B 13/02; B05B 15/652; B05B 1/04; B05B 1/34; E01H 4/023; F25C 3/02
See application file for complete search history.

(56) References Cited

U.S. PATENT DOCUMENTS

| | | | | |
|---|---|---|---|---|
| 305,551 A | * | 9/1884 | Vieweger | E01C 13/102 |
| | | | | 62/235 |
| 2,620,231 A | * | 12/1952 | King | B05B 3/16 |
| | | | | 239/255 |
| 2,999,645 A | * | 9/1961 | Kennedy | B05B 3/0453 |
| | | | | 239/230 |
| 3,425,630 A | * | 2/1969 | Fessler, Sr. | A01G 25/00 |
| | | | | 47/33 |
| 3,464,625 A | * | 9/1969 | Carlsson | F25C 1/00 |
| | | | | 239/14.2 |
| 3,528,093 A | * | 9/1970 | Eerkens | B05B 3/0453 |
| | | | | 239/97 |
| 4,824,020 A | * | 4/1989 | Harward | B05B 15/625 |
| | | | | 248/188 |
| 4,936,330 A | * | 6/1990 | LaHue | B60S 3/04 |
| | | | | 239/281 |
| 4,984,740 A | * | 1/1991 | Hodge | B05B 3/0453 |
| | | | | 239/513 |
| 5,331,826 A | * | 7/1994 | Stockhaus | A63C 19/10 |
| | | | | 62/235 |
| 5,642,861 A | * | 7/1997 | Ogi | B05B 1/262 |
| | | | | 239/553 |
| 6,322,027 B1 | * | 11/2001 | Hsu | F16M 11/34 |
| | | | | 248/188.7 |
| 7,246,756 B2 | * | 7/2007 | DeWitt | B05B 3/0432 |
| | | | | 239/245 |
| 7,303,153 B2 | * | 12/2007 | Han | B05B 1/267 |
| | | | | 239/203 |
| 7,950,599 B1 | * | 5/2011 | Burkhardt | B05B 3/06 |
| | | | | 239/582.1 |
| 9,776,195 B2 | * | 10/2017 | Russell | B05B 1/304 |
| 2003/0000239 A1 | * | 1/2003 | Dawe | F25C 3/02 |
| | | | | 62/235 |

(Continued)

*Primary Examiner* — Joseph A Greenlund
(74) *Attorney, Agent, or Firm* — Berggren Law Offices LLC; William R Berggren

(57) ABSTRACT

A movable apparatus for creating an outdoor ice rink and a method of using it comprising a spray head configured to apply a water spray from a height sufficient to maintain a stable vertical spray head orientation and periodically repositioning it until a desired ice rink s formed.

19 Claims, 4 Drawing Sheets

(56) References Cited

U.S. PATENT DOCUMENTS

| | | | |
|---|---|---|---|
| 2007/0051829 A1* | 3/2007 | Griffin | B05B 15/625 |
| | | | 239/242 |
| 2008/0083839 A1* | 4/2008 | Altaii | B05B 15/62 |
| | | | 239/281 |
| 2008/0121309 A1* | 5/2008 | Boise | A63H 27/10 |
| | | | 141/313 |
| 2009/0114735 A1* | 5/2009 | Collins | F25C 3/04 |
| | | | 239/2.2 |
| 2011/0284663 A1* | 11/2011 | Natterer | B05B 1/202 |
| | | | 239/587.5 |
| 2012/0074242 A1* | 3/2012 | Abraham, Jr. | F25C 3/04 |
| | | | 239/14.2 |
| 2015/0322631 A1* | 11/2015 | Li | A63C 19/10 |
| | | | 62/235 |
| 2017/0007913 A1* | 1/2017 | Ruffino | A63C 19/08 |
| 2018/0029057 A1* | 2/2018 | Pollok | B05B 15/65 |
| 2019/0022514 A1* | 1/2019 | Goldwitz | A63C 19/10 |
| 2019/0134658 A1* | 5/2019 | Cella | B05B 3/0438 |
| 2020/0246825 A1* | 8/2020 | Kessling | B05B 15/628 |
| 2022/0305509 A1* | 9/2022 | Zhang | B65G 69/188 |

\* cited by examiner

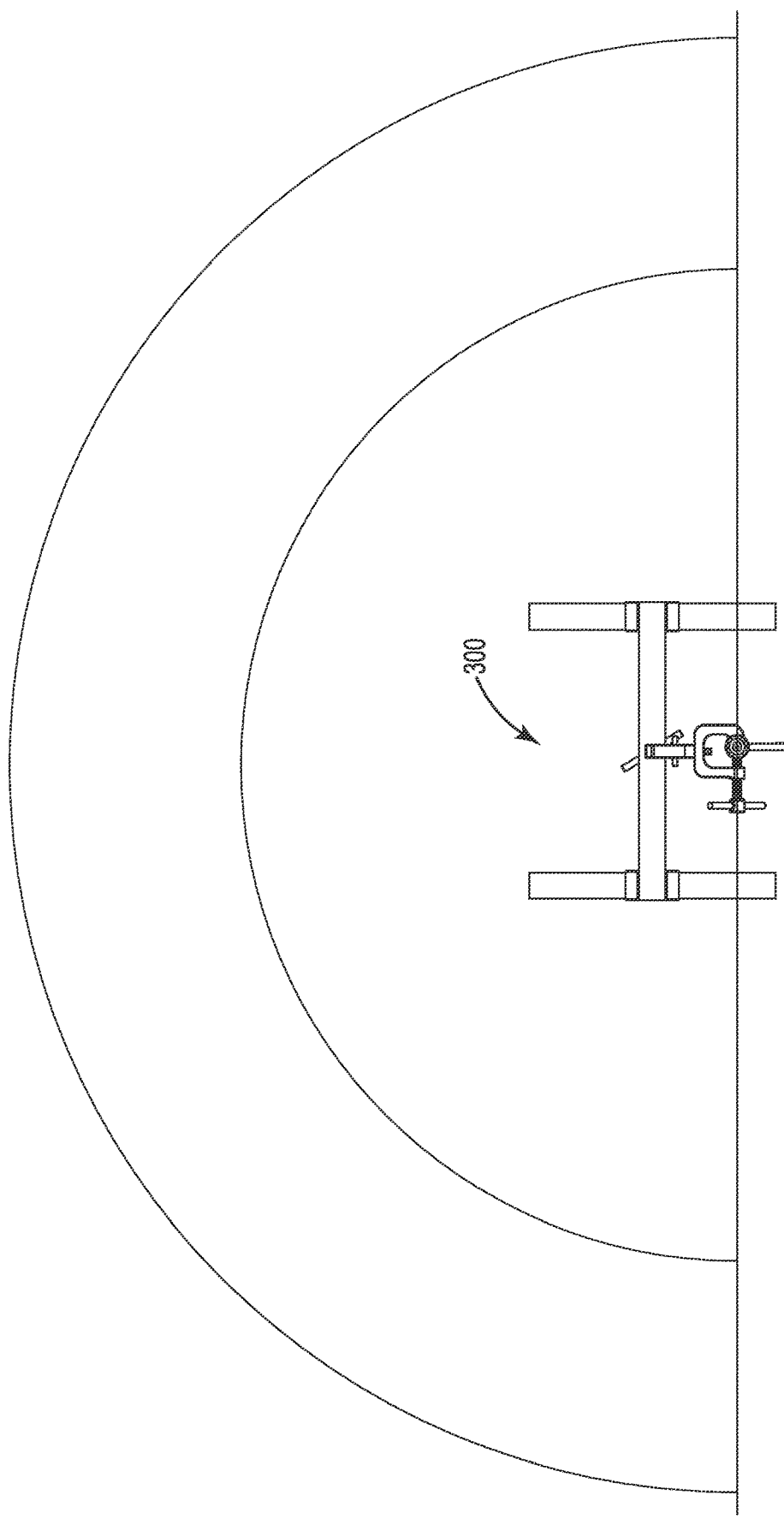

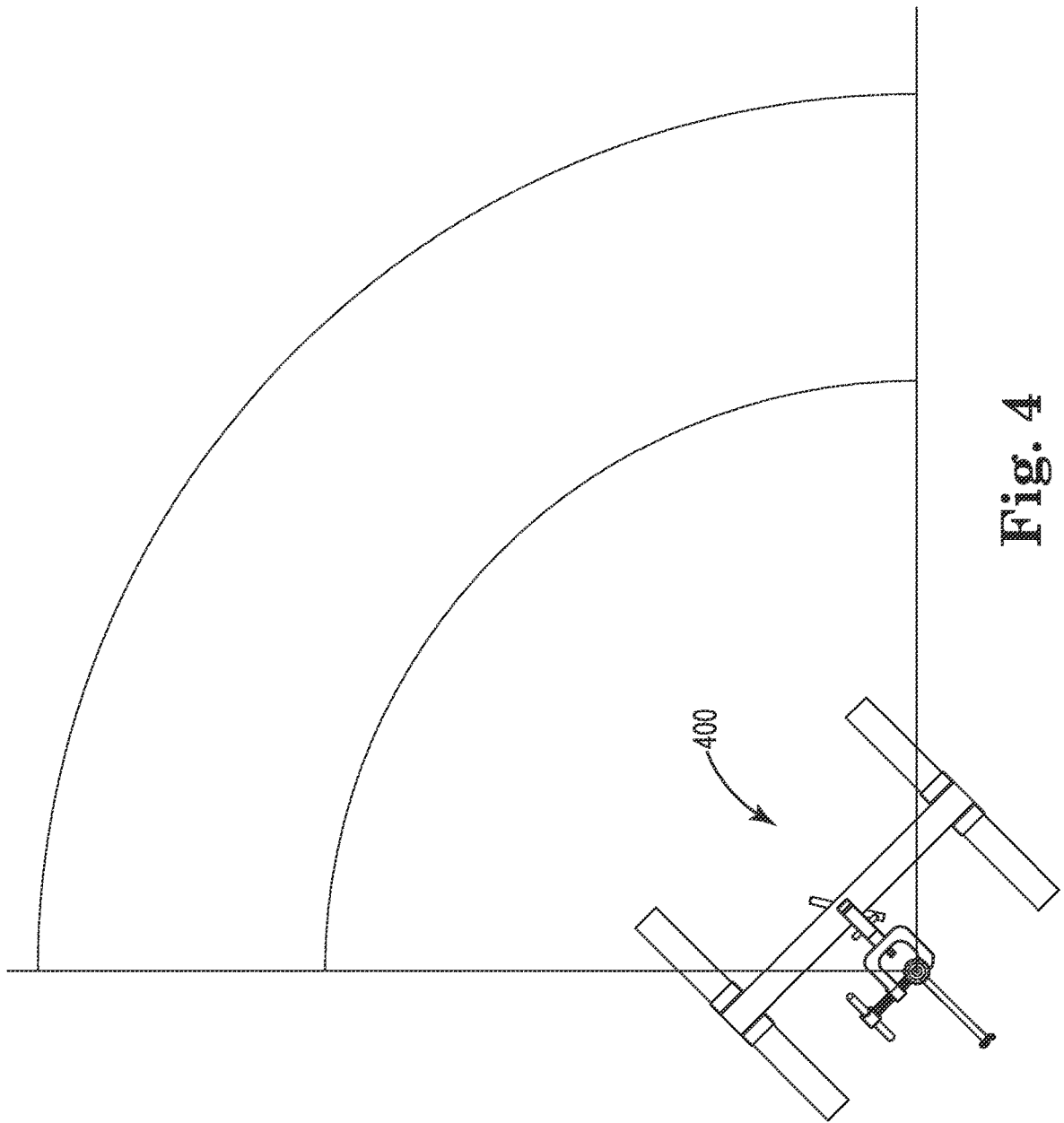

PORTABLE ICE RINK SPRINKLER

FIELD OF THE INVENTION

This application relates to a sprinkler for the formation of an outdoor ice rink.

BACKGROUND OF THE INVENTION

Currently there are numerous outdoor winter activities in regions, such as neighborhoods, school yards, or parks, where temperatures permit ice and snow to prevail. These activities include, for example, hockey, broom ball, figure skating, speed skating, and general recreational skating. Generally these activities are conducted in expensive structures where ice rinks are made and maintained under controlled conditions.

Outdoor ice rinks can be created manually by repeated flooding of the region designated for use for outdoor winter activities. Layer upon layer of water is uniformly sprayed manually using a hose to eventually produce an ice surface useful for the sports mentioned above. This repetitive spraying is time intensive and requires repeated manual application.

SUMMARY OF THE INVENTION

There are no sprinklers suitable for creating outdoor ice rinks in a back yard or any region designated for use for outdoor winter activities.

There is a need for an outdoor ice rink sprinkler to create an outdoor ice rink for activities such as, for, example, hockey, figure skating, and recreational skating. There is also a need to an ice rink sprinkler configured to make an economical ice rink to allow for greater access to ice rinks for sport enthusiasts.

An apparatus and method are provided that can economically make an outdoor ice rink in a region designated for outdoor winter sports. The apparatus, a portable ice rink sprinkler, comprises a spray head, a riser, a coupling, a movable support, and a clamp. The spray head has a first top end, a spray head shaft with a first bottom end, and at least one first nozzle and a control element configured to adjust a spray pattern of water to have at least a first horizontal spray pattern of a predetermined arc for a predetermined time at temperatures sufficient to freeze water into ice over ground to form at a first location a part of an ice rink and at least one second horizontal spray pattern of a predetermined arc for a predetermined time at temperatures sufficient to freeze water into ice over ground to form at a second location a part of an ice rink. The riser has a wall in communication with the spray head and has a body configured to be stationary, a second top end that is configured to restrain the first bottom end of the spray head shaft from leaving the riser, and a second bottom end. The coupling has a first end configured to affix to the second bottom end of the riser to form a first combination and a second end configured to affix to a third end of a water hos The movable support is a structure configured to support the spray head, riser, and coupling in a stable position to achieve an ice rink of a desirable size under conditions of ice formation and permit removal during construction of an outdoor ice rink, the movable support configured to be moved from one location to another during the construction of the outdoor ice rink, and comprises a moveable support base, a third top that is releasably affixed to the first combination of the riser and the coupling, and has a height sufficient to permit a desired area of ground other than the movable support base to be covered with water at a temperature sufficient to freeze the water into ice on the area of ground and allow the movable support to remain portable. The clamp is affixed to the combination of the riser and the coupling, and affixed to the top of the movable support in a manner configured to maintain the spray head in a stable vertical position under movement of water in the cold to form and maintain an ice rink on an area of ground where the ice has a smooth surface, and an area and thickness sufficient for people to play hockey on the ice.

Also provided is a method of using a portable ice rink sprayer apparatus to form an outdoor ice rink. One step is providing a portable ice rink sprinkler as described above. Another step is placing the movable support on at least one edge of where ice is desired to be formed. Still another step is affixing a water hose attached to a source of pressurized water to the second end of the coupling. Another step is flowing pressurized water through the water hose and through portable ice rink sprinkler apparatus to spray water on a designated area when the air temperature is cold enough to form ice. Still another step is moving the movable support periodically with the water pattern covering a different portion of the proposed ice rink until the ice rink is formed with a desired thickness of ice. Another step is turning off the source of water to the ice rink sprayer.

The portable ice rink sprinkler facilitates creation of outdoor ice rinks that can be suitable for playing ice sports in neighborhood regions as described above. The apparatus is compact and easily stored in a warm building such as, for example, a building, a garage, or a basement, when not in use.

BRIEF DESCRIPTION OF THE DRAWINGS

One or more features or preferred forms of the invention are described in the accompanying drawings. The drawings are described briefly below.

FIG. 3 is a perspective illustration of an embodiment of a portable ice rink sprinkler apparatus in use forming a side of an ice rink.

FIG. 4 is perspective illustration of an embodiment of a portable ice rink sprinkler in use forming a corner of an ice rink.

Figure 1:
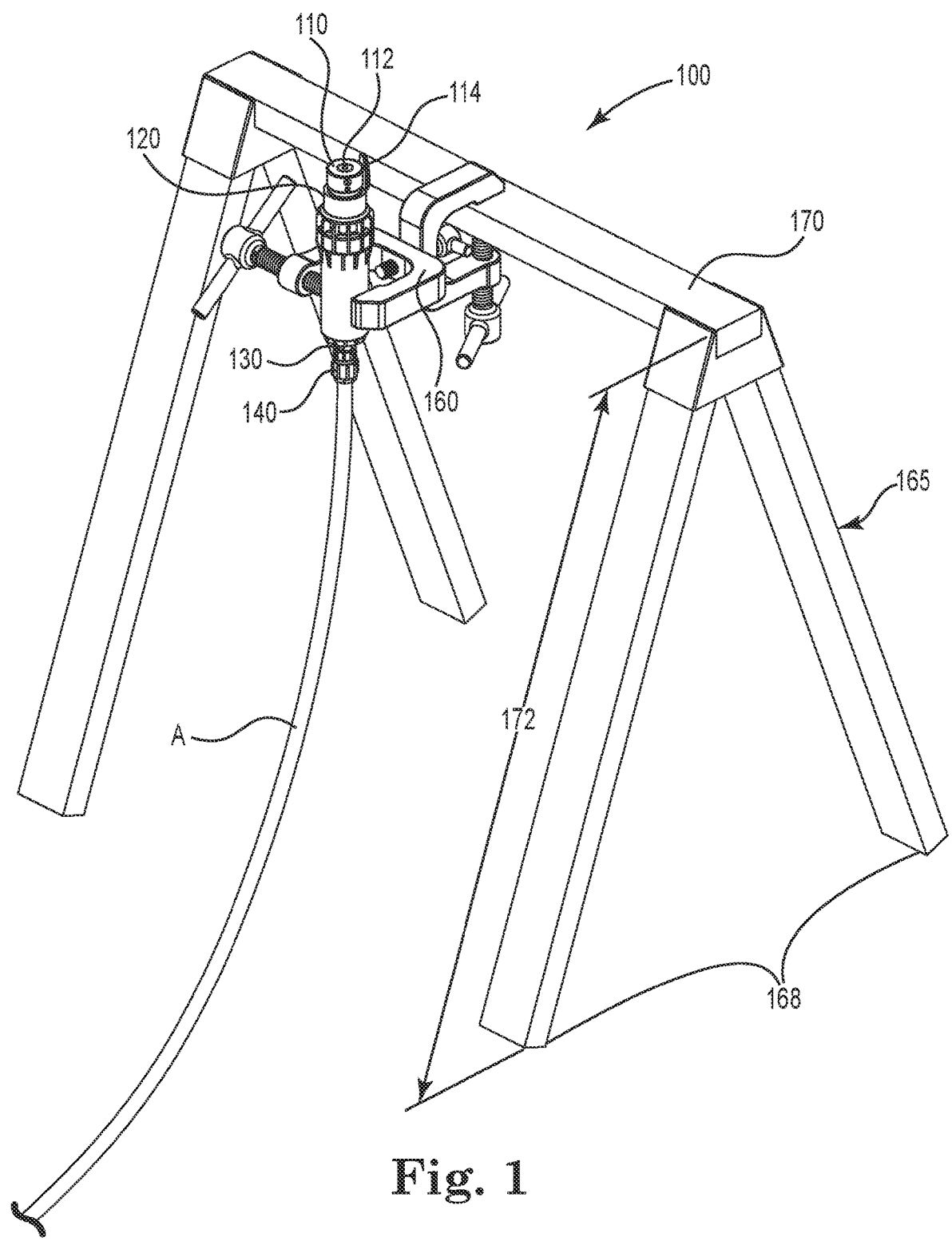
FIG. 1 is an embodiment of a portable ice rink sprinkler apparatus.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

My invention is a portable ice rink sprinkler for use making an ice rink in a yard that is suitable for playing ice games such as hockey.

Currently ice rinks are within buildings or made with a frozen pond. My invention allows one to make an outdoor ice rink in one's back yard that is suitable for playing games such as hockey. The invention comprises both an apparatus aspect and a method of using aspect.

The portable ice rink sprinkler apparatus comprises a spray head, a riser, a coupling, a movable support, and a clamp. In one embodiment, the spray head and riser combination is similar to one used for an underground lawn sprinkler system. The difference is that the spray head and riser are suspended several feet in the air to extend the outer arc of the horizontal pattern and the horizontal spray pattern is restricted to an arc between a 180-degree acc to create a side of an ice rink and a smaller arc, for example a 90-degree arc to create a corner. This is done with no water spraying where the portable support rests on the ground.

The spray head comprises at least one first nozzle. Some embodiments comprise one first nozzle and the spray head rotates to allow a first spray of water to cover a desired horizontal arc of ground. Some embodiments comprise one second nozzle below the first to configure a second spray of a lesser amount of water to cover ground closer to the spray head than covered by first nozzle as the spray head rotates. Some spray heads comprise a multitude of first nozzles in a ring around the spray head shaft to cover a horizontal arc of ground without the shaft having to rotate. Some spray heads have more than one first nozzle but less than a multitude in the same ring about the spray head shaft and include some rotation to achieve a desired coverage of water on a region of ground. In some embodiments more than one second nozzles are displaced in a ring around the spray head to form second sprays of water.

The spray head comprises a control element to adjust at least a horizontal spray pattern, a top end, a shaft, and a bottom end. If the spray head contains only one first nozzle, the controller is configured to vary rotation to achieve the horizontal arc of spray described above. If the spray head contains a multitude of first nozzles, the controller is configured to open or close those nozzles to permit the desired horizontal arc of spray. Some embodiments may comprise configurations of opening and closing nozzles and rotation the spray head with spray heads that contain more than one first nozzle but less than a multitude. In some embodiments, the controls have a cap or cover that may be easily lifted to adjust the controls as needed and protect them from ice forming on them during ice rink formation. Preferably the cap is rubber which does not fracture in the cold like plastic or other substances, and it prevents ice buildup on the controls at the top of the sprinkler head. In some embodiments, the controller is configured with at least one protruding knob to adjust at least the spray pattern. In some embodiments the control also is configured to change the velocity of the spray and thus the distance to spray reaches beyond the spray head. Depending on the velocity of the spray used and the number of nozzles in a vertical alignment, water may spray outward from the spray head to a distance ranging from ten feet to over thirty feet.

In its broadest sense, the riser is an element in communication with the spray head to facilitate achievement of obtainment of the desired horizontal arc of first spray. In some embodiments, it is a chassis that holds a spray head and is configured to allow it to rotate in a desired pattern or to open and close desired first nozzles and optionally second nozzles to achieve that pattern. In one embodiment the riser is similar to that used in underground sprinkler systems. The riser has a wall that is in communication with the shaft of the spray head, a top end that is configured to restrain the bottom end of the spray head shaft from passing the top end of the riser, and a bottom end that typically has a female opening. In some embodiments, the riser is similar to that used in underground sprinkler systems and is slideably engaged with the spray head. The riser and spray head combination is configured to allow water to cover a desired area of ground adjacent the riser with both a horizontal and vertical element to the water spray that is generated. Other sprinklers systems may be used if they spread water on adjacent ground and not where the portable ice rink sprinkler is positioned. In this manner, ice is not formed to anchor the movable support to the ground and make movement to another location of the forming ice rink difficult.

The coupling is next. It comprises a first end configured to affix to the riser and a second end configured to releasably affix to end of a water hose, typically the male end of a water hose, that is configured to releasably attach to a source of pressurized water through, typically, a faucet. In some embodiments, the coupling is unified in one piece.

In some embodiments, the coupling is divided into a pipe coupling and a water hose coupling. In this latter embodiment, the pipe coupling includes a first end configured to affix to the bottom end of the riser and a second end. Risers, particularly those used in underground sprinkler systems, may have threaded female bottom ends but may have bottom ends that are not threaded. Thus, the first end of the pipe coupling may be a male end that is either threaded or non-threaded as needed to affix to the bottom end of the riser. In the non-threaded case, the strength of the connection may be obtained through the use of adhering material such as thermoplastic or thermoset adhesives that retain their strength and ductility in moist and cold conditions such as that found outdoors when making ice rinks. Depending on whether the materials are plastic, metal or a composite, solder may also be used in manners well known to the construction industry. In the threaded case, in some embodiments, the threaded construction may provide sufficient adhesion between the riser bottom and the first end of the pipe coupling. In some embodiments, the adhesion may be augmented through the use of the above-mentioned adhesives and solder as desired. The second end may be male or female in construction depending on whether the construction of the first end of the water coupling is female or male, respectively. The water hose coupling has a first end configured to affix to the second end of the pipe fitting and a second end configured to releasably affix to end of the water hose.

The function of the coupling is to releasably affix the riser and spray head combination, or other sprinkler construction as discussed above, to a water hose. Any water hose able to carry pressurized water would work if the water hose coupling were so modified to work with that hose. However, common garden hoses are particularly suitable because they are easily available and attach to standardized outside faucet of most homes or buildings near parks or fields.

The movable support is affixed by the clamp to the riser, pipe fitting, water hose fitting combination with a height sufficient to prevent destabilization of the vertical position of the spray head during use. To achieve an ice rink of a desirable size without spray patterns on the formed ice, it is desirable to have water sprays having a distance of up to 30 feet or more are desirable. An apparatus configured to hold the conventional riser/spray used at a height of between 2 and 4 feet allows for such a distance. The movable support must be stable under use with a moving spray head for times needed to create an acceptable ice rink and be readily moveable to new locations about the planned ice rink during the time of creating the ice rink. The moveability property of the moveable support is important since this allows movement of the ice forming apparatus during the entire time of forming ice and does not require any deconstruction of the ice rink structure including pipes, itself. Moveability lets the apparatus form the ice where it is needed to both form an entire ice rink outdoors in whatever size and shape desired. It also allows resurfacing of different sections at different times when they melt at different rates.

Several embodiments are suitable. One embodiment is a conventional sawhorse with the clamp holding the riser, pipe fitting, water hose fitting combination to the top cross bar of the sawhorse. The sawhorse is readily available, stable under conditions of use, and is easily moved to another location about the perimeter of the proposed ice rink until the entire ice rink is formed. A sawhorse made of wood is particularly convenient because it typically is heavier than one made of metal or plastic which contributes to stability during operation. Also the wood does not bend or break under icing conditions when ice that is built up on the sawhorse needs to be chipped away with a hammer to permit mobility. A metal sawhorse can be bent easily by a hammer. A plastic sawhorse can break under icing conditions.

Other moveable supports may also be used, such as, for example, a vertical pole attached to an "X" shaped stand. The movable support must offer similar support, mobility, and height to satisfy use conditions of the apparatus during the formation of a single rice rink. Wooden supports are preferable for the same reasons mentioned above. for sawhorses.

The clamp is affixed to the riser and pipe coupling and water hose coupling combination, and configured to maintain the spray head in a stable vertical position under extended use conditions. Any clamp may be used as long as it is able to hold the riser in one position while the spray head is configured to spray water in an arc spraying water for up to ten hours or more at a time. In some embodiments, the clamp is removably affixed to the riser and pipe coupling and water hose coupling combination to permit disassemble when the ice rink is made. In some embodiments, one portion of the clamp portion is affixed to the riser and another portion of the clamp is affixed to the movable support are pivotally connected with a tightening bolt. In some embodiments, the clamp comprises a piece of woos with a hole to tightly hole the riser and a single C-clamp to hold the wood to the top of the support such that the riser is substantially vertical from the ground.

FIG. 1 is an embodiment of a portable ice rink sprinkler apparatus 100. A spray head 110 is slidably contained in a riser 120. The top of the spray head 110 contains a protruding control 112 for determining the arc of the horizontal spray. A cap or cover 114 that keeps the control from icing up during use A cap or cover 114 that keeps the control from icing up during use is shown slid off the control in a vertical position. Pipe coupling 130 is attached to the base of the riser and to a water hose coupling. Water hose coupling 140 is releasably affixed to a water hose A, here a garden hose that is not shown, releasably affixed to a water faucet and a source of pressurized water. With a clamp 160, a movable support 165 with a base 168, a top 170 and a height 172, is releasably affixed to the above elements that handle water.

Figure 2:
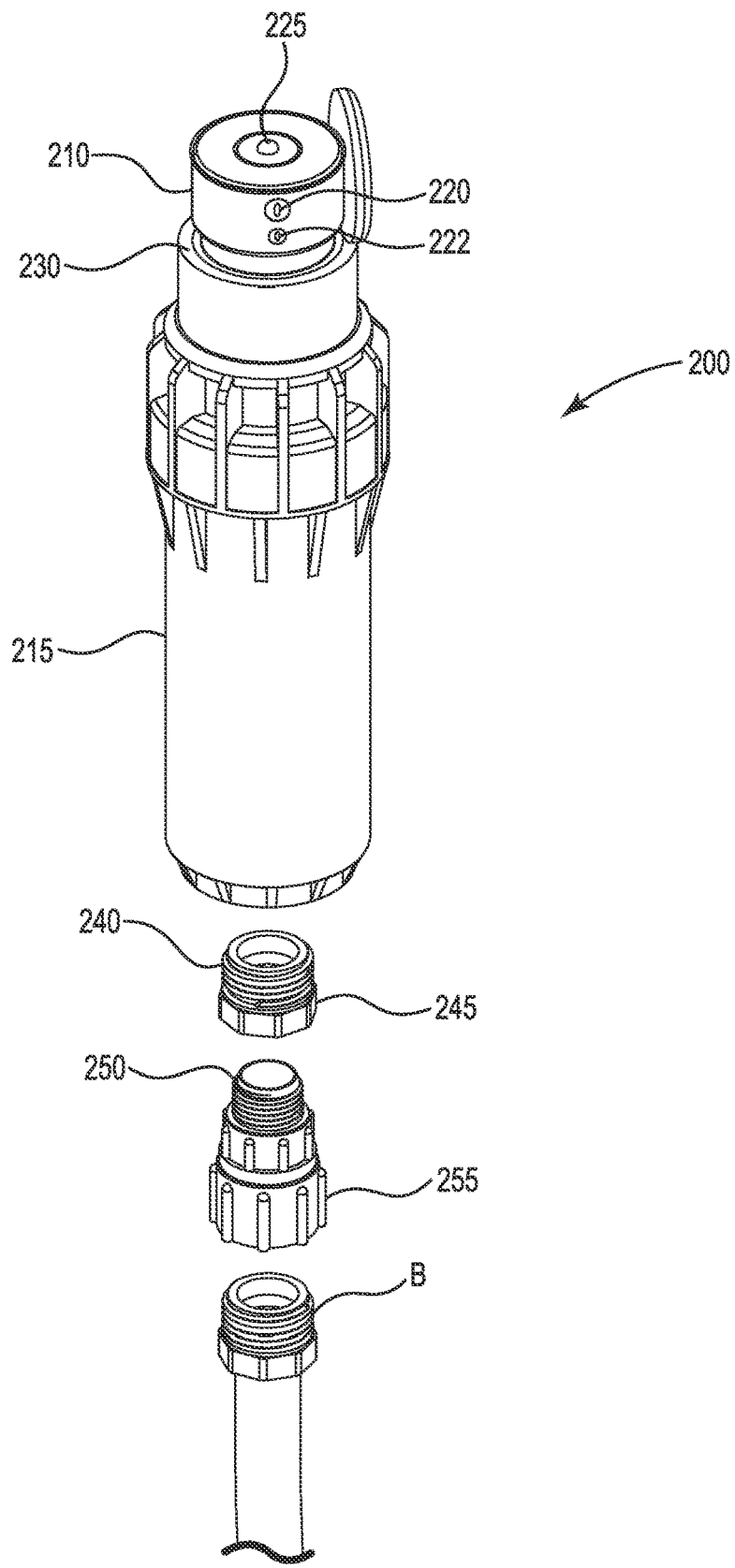
FIG. 2 is a perspective drawing of an embodiment of a riser with the spray head extended.

FIG. 2 is a perspective drawing of a riser 200 with a spray head 210 extended. Spray head 210 is slideably extended from riser shaft 215 under force of pressurized water exposing first nozzle 220 and second nozzle 222. Protruding controls 225 on top of the spray head, shown with an unnumbered cap or cover as shown in FIG. 1 as 114, controls the velocity of the water leaving the spray head and the horizontal arc of the spray. Riser 200 contains a wall 230 surrounding spray head 210 and a bottom that is affixed to a first end 240 of a pipe coupling. The second end 245 of the pipe coupling is affixed to the first end 250 of a water coupling. The second end 255 of the water coupling is configured to screwably and releasably affix to a male end of a garden hose.

Also provided is a method of using the potable ice rink sprayer to form an outdoor ice rink. The method of forming most ice rinks outdoors involves flooding an areas with water that eventually freezes into ice. A plastic liner is placed on the ground to prevent some water from soaking into the ground as the water on the surface of the ground eventually freezes. In contrast, the method of using my invention, the portable ice rink sprayer apparatus, to form an outdoor ice rink does not involve using an plastic liner to prevent water from absorbing into the ground as ice is forming on the surface of the ground. Water in the form of a spray freezes quickly on the surface of the ground and subsequent water spray freezes quickly to the existing frozen water to gradually build into a layer of ice of a desired thickness. Preferably, the air temperature is below 15 degrees F. for this quick freezing to occur well.

The method of using a portable ice rink sprayer apparatus to form an ice rink comprises five steps. One step is providing a portable ice rink sprinkler as described above. Another step is placing the movable support on at least one edge of where ice is desired to be formed. Still another step is affixing a water hose attached to a source of pressurized water to the second end of the coupling. Another step is flowing pressurized water through the water hose and through portable ice rink sprinkler apparatus to spray water on a designated area when the air temperature is cold enough to form ice. Still another step is moving the movable support periodically with the water pattern covering a different portion of the proposed ice rink until the ice rink is formed with a desired thickness of ice. Another step is turning off the source of water to the ice rink sprayer.

In some embodiments, the method of using a portable ice rink sprayer apparatus to form an outdoor ice rink includes an additional step. The step is adjusting the controller to form a desired spray pattern oriented toward the proposed ice rink.

In some embodiments, the method of using a portable ice rink sprayer apparatus to form an outdoor ice rink includes providing an embodiment of the riser and an additional step. The riser wall slideably encloses the shaft of the spray head and the top end is configured to restrain the bottom end of the spray head shaft from passing the top end of the riser. The additional step is raising the spray head in the riser with the flowing of the water through the portable ice rink sprinkler apparatus.

In some embodiments, the method of using a portable ice rink sprayer apparatus to form an outdoor ice rink includes additional steps. One step is repeating the steps of the previously described method over several days until the ice rink has a desired shape and ice thickness. Another step is disconnecting the water hose from the portable ice rink sprinkler and the source of pressurized water between each use.

In some embodiments, the method of using a portable ice rink sprayer apparatus to form an outdoor ice rink includes an additional step. This step is storing the water hose and portable ice rink sprinkler between each use in a place with a temperature above that of the freezing point of water to permit water to drain from the system and not allow water to freeze in the water hose or portable ice rink sprinkler.

When the ice is built up to a thickness of between at least 1-4 inches or any other desired thickness, the portable ice rink sprinkler is moved to a new location. When corners of an ice rink field are desired to be formed, the arc of spray is changed from 180 degrees to 90 degrees.

As time passes, an ice rink may need to be reconditioned. In some embodiments, the method first mentioned above, includes additional steps. One is placing the movable support on one edge of a desired ice rink where the ice rink needs reconditioning. Another is affixing a water hose to the second end of the coupling with a desired spray pattern oriented toward the proposed ice rink. Still another is flowing pressurized water through the water hose, raising the spray head in the riser and spraying water on a designated area when the air temperature is cold enough to form ice. Other steps include moving the movable support periodically with the pattern covering the area needing reconditioning, turning off the source of water to the ice rink sprayer, disconnecting the water hose from the portable ice rink sprinkler apparatus and the source of pressurized water between each use, and storing the water hose and portable ice rink sprinkler apparatus between each use in a place with a temperature above that of the freezing point of water to permit water to drain from the portable ice rink apparatus and not allow water to freeze in the water hose or portable ice rink sprinkler apparatus.

In some embodiments, the methods mentioned above, includes another step. The step is adjusting the controller periodically during formation of the ice rink to achieve a desired spray pattern and spray velocity at each location to form the desired shape and thickness of ice for the outdoor ice rink.

FIG. 3 is a perspective illustration of an embodiment of a portable ice rink sprinkler in use forming a side of an ice rink. Ice rink sprinkler apparatus 300 is positioned at one side of a proposed outdoor ice rink. The spray control is set for a 180-degree horizontal arc. The distance of the spray of water outward from ice rink sprinkler apparatus 300 is at least twenty feet and may be over thirty feet. The spray is continued until the ice is built up to a desired thickness—in some cases at least 1-4 inches or to any other desired thickness. This may take over 10 hours in some cases before the portable ice rink sprinkler is repositioned to another proposed ice rink edge.

FIG. 4 is perspective illustration of an embodiment of a portable ice rink sprinkler in use forming a corner of an ice rink. Ice rink sprinkler apparatus 400 is positioned at one corner of a proposed outdoor ice rink. The spray control is set for a 90-degree horizontal arc. The distance of the spray of water outward from ice rink sprinkler apparatus 400 is at least twenty feet and may be over thirty feet. The spray is continued until the ice is built up to a desired thickness—in some cases at least 3 inches and over 6 inches. This may take over 10 hours in some cases before the portable ice rink sprinkler is repositioned to another proposed ice rink corner.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. A portable ice rink sprinkler apparatus, comprising:
    a spray head having a first top end, a spray head shaft with a first bottom end, and at least one first nozzle and a control element configured to adjust a spray pattern of water to have at least a first horizontal spray pattern of a first predetermined arc for a first predetermined time at temperatures sufficient to freeze water into ice over ground to form at a first location a part of an outdoor ice rink and at least a second horizontal spray pattern of a second predetermined arc for a second predetermined time at the temperatures sufficient to freeze water into ice over ground to form at a second location a second part of the outdoor ice rink;
    a riser having a wall in communication with the spray head and having a body configured to be stationary, at least one second top end that is configured to restrain the first bottom end of the spray head shaft from leaving the riser, and a second bottom end;
    a coupling with a first end configured to affix to the second bottom end of the riser to form a first combination and a second end configured to affix to a third end of a water hose;
    a movable support having a structure configured to support the spray head, riser, and coupling in a stable position to achieve the outdoor ice rink of a desirable size under conditions of ice formation and permit removal during construction of the outdoor ice rink, the movable support configured to be moved from one location to another during the construction of the outdoor ice rink, and comprising a moveable support base, a third top that is releasably affixed to the first combination of the riser and the coupling, and has a height sufficient to permit a desired area of ground other than the movable support base to be covered with the water at the temperatures sufficient to freeze the water into ice over ground and allow the movable support to remain portable; and
    a clamp affixed to the combination of the riser and the coupling, and affixed to the top of the movable support in a manner configured to maintain the spray head in a stable vertical position under movement of water in a cold environment to form and maintain the outdoor ice rink on the desired area of ground where the ice has a smooth surface, and an ice area and an ice thickness sufficient for people to play hockey on the ice.

2. The portable ice rink sprinkler apparatus of claim 1 wherein
    the riser wall slidably encloses the spray head shaft and the second top end is configured to restrain the first bottom end of the spray head shaft from passing the second top end of the riser.

3. The portable ice rink sprinkler apparatus of claim 1 wherein the coupling further comprises
    a pipe coupling with a fourth end configured to affix to the second bottom end of the riser and a fifth end and
    a water hose coupling with a sixth end configured to affix to the fifth end of the pipe coupling and a second end configured to affix to the third end of the water hose.

4. The portable ice rink sprinkler apparatus of claim 1 wherein the control element has a cover to prevent buildup of ice during use that may make operation of the control element difficult at the temperatures sufficient to freeze water into ice over around.

5. The portable ice rink sprinkler apparatus of claim 1 wherein the spray pattern is at least in a horizontal arc of between 90 degrees and 180 degrees.

6. The portable ice rink sprinkler apparatus of claim 1 wherein the spray head is configured to deposit a uniform layer of water over the desired area of ground at the temperatures sufficient to freeze the water into ice over ground.

7. The portable ice rink sprinkler apparatus of claim 1 wherein the control element is configured with at least one protruding knob to adjust at least the horizontal spray pattern at the temperatures sufficient to freeze water into ice over the ground.

8. The portable ice rink sprinkler apparatus of claim 1 wherein the control element is further configured to vary a velocity of a spray of water at the temperatures sufficient to freeze the water into ice over the ground.

9. The portable ice rink sprinkler apparatus of claim 1 wherein the spray head comprises more than one first nozzle around the spray head shaft.

10. The portable ice rink sprinkler apparatus of claim 1 wherein the spray head comprises at least one second nozzle beneath the first nozzle and configured to create a second spray of water between the first horizontal spray pattern and the movable support base at the temperatures sufficient to freeze water into ice over the ground.

11. The portable ice rink sprinkler apparatus of claim 1 wherein the structure of the moveable support is a wooden sawhorse.

12. A method of using a portable ice rink sprayer apparatus to form an outdoor ice rink, comprising the steps of:
   providing a portable ice rink sprinkler apparatus comprising
      a spray head having a first top end, a spray head shaft with a first bottom end, and at least one first nozzle and a control element configured to adjust multiple spray patterns of water to have at least a first horizontal spray pattern of a first predetermined arc for a first predetermined time at first temperatures sufficient to freeze water into ice over ground to form at a first location a part of an outdoor ice rink and at least a second horizontal spray pattern of a second redetermined arc for a second predetermined time at the first temperatures sufficient to freeze water into ice over ground to form at a second location a second part of the outdoor ice rink;
      a riser having a wall in communication with the spray head and having a body configured to be stationary, at least one second top end that is configured to restrain the first bottom end of the spray head shaft from leaving the riser, and a second bottom end;
      a coupling with a first end configured to affix to the second bottom end of the riser to form a first combination and a second end configured to affix to a third end of a water hose;
      a movable support having a structure configured to support the spray head, riser, and coupling in a stable position to achieve the outdoor ice rink of a desirable size under conditions of ice formation and permit removal during construction of the outdoor ice rink, the movable support configured to be moved from one location to another during the construction of the outdoor ice rink, and comprising a moveable support base, a third top that is releasably affixed to the first combination of the riser and the coupling, and has a height sufficient to permit a desired area of ground other than the movable support base to be covered with the water at the first temperatures sufficient to freeze the water into ice over ground and allow the movable support to remain portable; and
      a clamp affixed to the combination of the riser and the coupling, and affixed to the top of the movable support in a manner configured to maintain the spray head in a stable vertical position under movement of water in a cold environment to form and maintain the outdoor ice rink on the ground where the outdoor ice rink has a desired shape and a desired area, and the ice has a desired smooth surface and a desired thickness sufficient for people to play hockey on the ice;
   placing the movable support on at least one edge of where ice is desired to be formed;
   affixing the water hose attached to a source of pressurized water to the second end of the coupling;
   flowing pressurized water through the water hose and through the portable ice rink sprinkler apparatus and spraying water in the form of the first horizontal spray pattern of the first predetermined arc for the first predetermined time at first temperatures sufficient to freeze water into ice over ground to form at the first location a first part of an outdoor ice rink on the first location at the first temperatures sufficient to freeze the water into ice over ground;
   moving the movable support and flowing pressurized water through the water hose and through the portable ice rink sprinkler apparatus and spraying water in the form of the second horizontal spray pattern of the second predetermined arc for the second predetermined time at the first temperatures sufficient to freeze water into ice over ground to form at the second location the second part of the outdoor ice rink;
   repeating the previous two steps at other locations until the outdoor ice rink has the desired shape and the desired area, and the ice has the desired smooth surface and the desired thickness; and
   turning off the source of water to the portable rink sprayer.

13. The method of using the portable ice rink sprayer apparatus to form the outdoor ice rink of claim 12 further comprising the step of
   adjusting the control element to form a spray pattern oriented toward the outdoor ice rink to achieve the outdoor ice rink with the desired shape and the desired area, and the ice with the desired smooth surface and the desired thickness at the location being sprayed.

14. The method of using the portable ice rink sprayer apparatus to form the outdoor ice rink of claim 12, wherein the riser wall slidably encloses the shaft of the spray head and the second top end is configured to restrain the first bottom end of the spray head shaft from passing the second top end of the riser and the method further comprises the step of raising spray head in the riser.

15. The method of using the portable ice rink sprayer apparatus to form the outdoor ice rink of claim 12, further comprising the steps of:
   repeating the steps over several days until the outdoor ice rink has the desired shape and the desired area, and ice has the desired smooth surface and the desired thickness, and
   disconnecting the water hose from the portable ice rink sprinkler and the source of pressurized water between each use.

16. The method of using the portable ice rink sprayer apparatus to form the outdoor ice rink of claim 12 further comprising the step of
   storing the water hose and portable ice rink sprinkler between each use in a place with a second temperatures above that of the freezing point of water to permit water to drain from the system and not allow water to freeze in the water hose or the portable ice rink sprinkler.

17. The method of using the portable ice rink sprayer apparatus to form the outdoor ice rink of claim 12 further comprising the steps of
   placing the movable support on one edge of an area of the outdoor ice rink that needs reconditioning;

affixing a water hose to the second end of the coupling with the desired spray pattern oriented toward the area of the outdoor ice rink that needs reconditioning;

flowing pressurized water through the water hose, raising the spray head in the riser, and spraying water at the first temperatures sufficient to freeze the water into ice over ground on at least a portion of the area of the outdoor ice rink that needs reconditioning;

moving the movable support periodically with the spray pattern covering the desired area needing reconditioning;

turning off the source of water to the ice rink sprayer;

disconnecting the water hose from the portable ice rink sprinkler apparatus and the source of pressurized water between each use; and storing the water hose and portable ice rink sprinkler apparatus between each use in a place with a second temperature above that of the freezing point of water to permit water to drain from the portable ice rink sprinkler apparatus and not allow water to freeze in the water hose or portable ice rink sprinkler apparatus.

18. The method of using the portable ice rink sprayer apparatus to form the outdoor ice rink of claim 12 wherein the first temperatures sufficient to freeze the water into ice during spraying is below 15 degrees F.

19. The method of using the portable ice rink sprayer apparatus to form the outdoor ice rink of claim 12 further comprising the step of adjusting the control element periodically during formation of the ice rink to achieve the desired spray pattern and spray velocity at each location to form the outdoor ice rink with the desired shape and the desired area, and the ice with the desired ice smooth surface and the desired ice thickness.

* * * * *